(12) United States Patent
Neeley et al.

(10) Patent No.: US 7,277,450 B2
(45) Date of Patent: Oct. 2, 2007

(54) SCALABLE METHOD AND ARCHITECTURE FOR AN ACTIVE SWITCH DEFINING A NETWORK EDGE HAVING MULTIPLE UPLINKS AND USING WAVELENGTH DIVISION MULTIPLEXING

(75) Inventors: Kevn Neeley, Duluth, GA (US); Wilson E. Sawyer, East Hampstead, NH (US); Stuart Green, Salem, NH (US); David Gingold, Somerville, MA (US)

(73) Assignee: Arris International, Inc., Suwanee, GA (US)

( * ) Notice: Subject to any disclaimer, the term of this patent is extended or adjusted under 35 U.S.C. 154(b) by 1191 days.

(21) Appl. No.: 10/194,338

(22) Filed: Jul. 12, 2002

(65) Prior Publication Data

US 2003/0012485 A1    Jan. 16, 2003

Related U.S. Application Data

(60) Provisional application No. 60/304,914, filed on Jul. 12, 2001, now abandoned.

(51) Int. Cl.
*H04L 12/56* (2006.01)
(52) U.S. Cl. .......................... 370/420; 370/463; 710/2
(58) Field of Classification Search ................ 370/401, 370/465, 498, 352, 419, 420, 463; 705/40; 379/93.01; 455/561; 710/2; 716/14
See application file for complete search history.

(56) References Cited

U.S. PATENT DOCUMENTS

| 6,584,109 B1* | 6/2003 | Feuerstraeter et al. ...... 370/401 |
| 6,826,195 B1* | 11/2004 | Nikolich et al. ............ 370/465 |
| 2002/0162083 A1* | 10/2002 | Fowler ........................ 716/14 |

* cited by examiner

*Primary Examiner*—John Pezzlo
(74) *Attorney, Agent, or Firm*—John L. Doughty

(57) ABSTRACT

An active optical network switch having a switch module, a plurality of uplink modules and a plurality of downlink modules connected to a backplane for connecting the modules and passing signals among them. A CPU module assists in managing the routing of traffic signals by the switch module; said modules and backplane are enclosed in an environmentally hardened housing. Six downlink modules may include four downlink ports each, for connecting the switch to twenty-four subscribers. Multiple switches may be daisy-chained together; one being a master and the remainder being slaves, to increase the number of subscribers that are served by an uplink fiber/pair. Dense Wavelength Division Multiplexing may aggregate traffic signals between many subscribers and a CO/head end along a single backhaul fiber. Switch software may provide "network edge" functions including traffic shaping, policing, filtering and aggregation, and address control.

13 Claims, 6 Drawing Sheets

SCALABLE METHOD AND ARCHITECTURE FOR AN ACTIVE SWITCH DEFINING A NETWORK EDGE HAVING MULTIPLE UPLINKS AND USING WAVELENGTH DIVISION MULTIPLEXING

CROSS REFERENCE TO RELATED APPLICATION

This application claims priority under 35 U.S.C. 119(e) to the benefit of the filing date of Sawyer, et al., U.S. provisional patent application No. 60/304,914 entitled "Environmentally Hardened Platform for Delivering Fiber Services to the Home", which was filed Jul. 12, 2001, now abandoned and is incorporated herein by reference.

FIELD OF THE INVENTION

This invention relates, generally, to communication networks and, more particularly, to switched Ethernet network access for a plurality of dissimilar devices.

BACKGROUND

Recently, the number of network connections providing high-speed access has been growing. The deployment of these connections has typically been over networks using copper digital subscriber lines ("DSL") and existing Community Antenna Television systems ("CATV"), and in some cases wireless links. The demand by consumers for these technologies is based on their desire for faster service than is provided by dial-up modem systems. While traditional dial-up modems typically have a rated download speed of 56,000 bits per second ("bps"), DSL modems can provide up to 1,500,000 bps and cable modems can theoretically provide up to 2,500,000 bps. Thus, these two technologies have the capability to provide up to about 50 times the access speed of a dial-up modem system.

However, another technology known in the art as Fiber-To-The-Home ("FTTH"), can provide 155,000,000 bps or higher, or at least 100 times the download speed of current high-speed Internet technologies. FTTH typically uses Ethernet technology, which is known in the art, to achieve these high transfer rates. Technology referred sometimes referred to as Fast Ethernet can provide in the range of 100 Mbps and an even newer technology can provide speeds in the billion bits-per-second range. Appropriately, this technology is often referred to in the art as Gigabit Ethernet. For present purposes, Fast Ethernet refers to technology that transmits data in the 100 Mbps magnitude range and gigabit Ethernet refers to technology that transmits in the range of a billion bps or higher.

Obviously, the great advantage of FTTH is speed. The downside is that currently the cost is higher than traditional telephony (sometimes referred to as "plain old telephone service", or "POTS") or CATV systems, which are the most common networks for implementing the Internet.

However, as with all technologies, the cost of FTTH is falling as the deployment rate increases. Much like CATV during its early stages of deployment, whether FTTH is available will increasingly be a factor in the calculus for making a home buying decision. This is because not only is the speed of Internet use increased, but also because other services, such as voice-over-IP, video-over-IP and high definition television ("HDTV"), will be more readily available. This may ultimately reduce a subscriber's costs, as all of these services may be offered by a single provider on one incoming fiber optic cable, or drop cable, to a subscriber's house or place of business.

Although FTTH is currently being deployed, its development and deployment are still in their infancy. Accordingly, as is typically the case when new technology is in the early stages of its life, many vendors, in the spirit of competition, are developing new products to implement FTTH. And, as is also typical, these various products are often incompatible with one another. For example, a different method and protocol for transmitting and receiving Internet data signals may be employed from those used for transmitting and receiving HDTV or other video signals.

When this situation occurs, a separate piece of equipment is typically required for decoding and encoding a signal received or sent over the drop cable before the signal is recognizable by the piece of equipment for which it was intended. For example, a television set may require a set-top-box for decoding a HDTV signal before it is presented to the television set, while a personal computer may require a cable modem for interfacing with the network. This has been the state of affairs for a while, since telephony companies traditionally have provided services on copper twisted pair cables and CATV network providers have typically delivered services on typically coaxial electrical conductors.

Although subscribers have grown accustomed to the typical scenario of multiple providers for different services, such as, for example, a cable company providing CATV services, a separate Internet service provider and a separate telephone company providing telephony services, this may not be a desirable scenario for the subscribers or the providers. A subscriber may not enjoy making separate monthly payments to each of the providers. Furthermore, the subscriber probably laments the cost of the service while making the payments. Many of the providers would like to offer more than only one service, i.e. a telephone company may wish to compete with a cable company by providing television programming.

Such competition would, over time, reduce the cost to the subscriber of the television programming and increase the quality of the programming. One of the reasons the providers have been slow to offer services outside of their core services is uncertainty of laws and regulations. Only recently has the United States Congress, and federal agencies and courts, begun passing legislation, promulgating rules and issuing decisions that relax previous prohibitions against a single service provider offering more than their traditionally core service. Such developments in the law and regulations are typically slow to formulate. Thus, providers have been reluctant to test the legal waters, and therefore reluctant to make the investment in infrastructure and technology that would spur equipment makers to develop new technologies and products.

However, as the regulatory oversight by the federal and state governments declines, more and more companies are beginning to offer composite services. This requires that technology be available to facilitate the offering of these services.

One technological hurdle that exists is the one previously discussed in that many equipment makers rely on different technologies that are not always compatible with one another and with every network technology used by the various providers. For example, an optical network provider may employ 100baseF technology in its network, while a coaxial network provider may employ 100baseT technology. Similarly, one optical equipment manufacturer may make equipment configured for multimode 100 Mbps Ethernet networking, another for single mode 100 Mbps Ethernet networking, another for 1310 nm gigabit Ethernet networking and another for ITU grid gigabit Ethernet networking. Furthermore, subscribers may receive cable modem services from CATV providers that conform to the DOCSIS standard. This equipment must be able to transmit and receive a signal and convert it to format compatible with the various types of subscriber equipment devices, yet still be relatively inexpensive.

To date, the architecture primarily used by network operators is the Passive Optical Network ("PON"). A PON typically aggregates 16 to 32 subscribers per fiber at an aggregation point, which is typically a splitter or two splitters at different locations. The range of such a system is limited to less than 20 km, thereby ensuring the need for a network of central office ("CO") locations throughout the serving area.

Parameters that are of prime importance to network operators contemplating the deployment of FTTH networks include cost per subscriber, network scalability, which relates to future proofing and investment lifecycles. A system that can be easily scaled to offer more bandwidth or serve more subscribers is more likely to remain competitive in the future as new services are introduced to the growing community of subscribers with broadband access.

Another important parameter is that of aggregation efficiency; in other words, the number of subscribers that can be served over a single fiber. This is because the costs in the CO/head-end and the long-haul part (portion between CO/head end and splitter or local switch node) of the network are directly related to the aggregation efficiency. An operator will typically have to build additional fiber infrastructure within a service area as customers and services are added that require increases in bandwidth over existing infrastructure. An efficient aggregator is one who can reduce the need to upgrade portions of the longer-haul part of the fiber network, thereby substantially reducing the network costs associated with network deployment vis-à-vis his or her competitors. Thus, there is a need for a method and architecture that provides scalability that, for example, eliminates or postpones the need to install additional fiber to facilitate additional bandwidth.

In addition to the above, another important parameter that concerns network operators is the need for building locations in a serving area. Due to range limitations and/or lack of suitable outside-plant equipment, many competing architectures need multiple 'secondary hub' or CO locations throughout the serving area. The processes and costs associated with identifying, acquiring and preparing suitable locations for building secondary hubs can be extremely burdensome, especially for new or small operators, as they typically involve real estate negotiations, procurement of local-authority-permits and substantial construction costs to build from scratch or modify a given location. These burdens place limits on the speed and magnitude of new service deployment, and can be especially fatal for small operators who need to quickly achieve a critical mass of paying subscribers. Equipment suitable for use as outside plant, i.e. suitable for outdoor or underground use, and with sufficient optical range to reach remote single-serving locations, greatly reduces the need for multiple building locations. Thus, there is a need for a device that facilitates network implementation without the need for many closely located buildings for secondary hubs.

Another concern for network service providers is the prevention of hacking and address spoofing, activities both of which can render the network at least temporarily out of service. Thus, there is a need for a method and architecture for preventing address spoofing and hacking.

SUMMARY

An object of the invention is to use an environmentally hardened housing to isolate an optical switch having active components from an outdoor or underground environment. This facilitates placing the active element in the outside plant relatively proximate the subscriber, typically within 6500 feet, thereby reducing the cost of the components at the subscriber premises to provide a substantially lower overall system cost as compared to a PON.

It is another object to provide a switch that supports high-speed ports (gigabit Ethernet for example). Such high-speed ports are typically used for operations such as, for example, uplink traffic signal transfer between the switch and a CO/head-end, but a high-speed port may also be configured to provide gigabit Ethernet service to a subscriber, such as a commercial place of business or a multi-dwelling residential structure. Furthermore, the high-speed ports can support more than one technology; one in particular being Dense Wavelength Division Multiplexing ("DWDM"). Other technologies may include, but are not limited to, CWDM, SONET and SDH.

Multiple uplinks provide the ability to create more complex network architectures between the outside plant switch and the operator's premise equipment, which can be optimized, for example, by using a dedicated link to support video. Furthermore, multiple uplinks allow the architecture to be scaled to provide varying amounts of bandwidth capability at the switch.

It is another object to provide fast-Ethernet transceiver modules having greater than two ports. These ports are typically configured as downlink (subscriber side) ports for connecting drop lines to subscriber-premise-interface-equipment. However, at least one of the fast-Ethernet ports may be configured as an uplink port. The fast-Ethernet and high-speed Ethernet transceiver modules are 'plug-and-play; that is, when a module is inserted into the switching device and received by the backplane, a switch CPU-controller and software recognize the module type and can automatically provision the subscriber equipment or operator equipment connected to either a downlink port or an uplink port, respectively It is yet another object to facilitate use of additional uplink fibers, and, hence, support additional subscribers, by simply installing additional 'hot-swap' uplink modules. 'Hot-swappable' refers to the characteristic of an optical switch's modular equipment for driving the uplink and downlink fibers that allows addition, removal or replacement of a module without having to disconnect, down-power, or otherwise remove from service the entire switch, thereby eliminating the impact on the service to the subscribers that are not associated with the links being serviced.

This allows the operator to scale the bandwidth capabilities of the network to cost-effectively meet increased network service requirements while impacting no, or few, current subscribers. Furthermore, since modules can be hot-swapped, the network is easily configurable to accommodate various types and kinds of network interface units at the subscriber's location and the CO/head-end. For example, a commercial office building may have different types of network interface equipment than a residential subscriber. Furthermore, to achieve better performance, either type of subscriber may wish, from time-to-time, to upgrade their premise equipment. Thus, the hot-swappable modularity allows efficient modification of the service providers interface equipment.

DWDM capability in the uplink facilitates sharing of a single fiber by uplinks from multiple switches because each uplink can use a separate wavelength pair within the fiber, or a pair of fibers, one of the pair for transmitting and one for receiving traffic signals between a CO/head end and a switch device. This leads to greatly decreased fiber requirements in the 'backhaul', or long-haul, portion of the network, as a single fiber can support 960 subscribers, for example.

Thus, it is yet another object to provide long-haul capability in the uplinks. Providing long-haul capability in the uplink removes the need for secondary hubs or central office locations throughout the serving area.

It is yet another object to provide network edge functionality that substantially increases the effort required to successfully hack and spoof the network, for example. Other edge functionality may also be provided. These are functions that have been traditionally performed at an SPE device or at a CO/head end.

An aspect includes a network-switching device for routing broadband signals between an uplink fiber or fibers and a plurality of subscriber-premise-equipment connected fibers. The network-switching device comprises a packet processing switch means for aggregating and routing signals between a plurality of network-side, uplink ports and a plurality of subscriber-side, downlink ports. The ports transmit and receive signals from outside plant fibers, and interface with the packet processing switch means via modular transceivers. These transceiver modules are received by a backplane that also receives the packet processing switch means; thus, an interface between the transceivers and the packet processing switch is provided. The uplink ports may be connected to a CO/head-end via a high-speed Ethernet fiber optic cable. The subscriber-side downlink ports may be connected to a plurality of subscriber-premise equipment components via a fast-Ethernet fiber optic cable.

The backplane is configured for use with transceiver means modules that are physically similar but having various functionality, thereby accommodating various types of subscriber-premise-equipment devices. A subscriber-premise-equipment ("SPE") device may be a simple media converter that translates 100baseF to 100baseT; the SPE, which may be located on the outside wall of a subscriber's house or place of business, may also provide a physical service demarcation.

The transceiver modules are hot-swappable to allow installation and removal in the field without the need to remove the switch device from the network, which would typically increase network disruption and disruption of service to subscribers being served from the switch device. This also provides the benefit of mitigating initial installation expenditures, as modules do not have to be installed at the time of switch installation if all of the subscriber-premise-equipment-connected ports will not immediately have subscribers connected thereto.

The switch means, the modules and the backplane, along with various other components of the device, including a power supply, power distribution board, expansion slots, power entry port and fiber entry port may be contained in an outdoor enclosure, such as, for example, a watertight, die-cast corrosion-proof aluminum clamshell box. This is advantageous because the active components of the switch, which allow greater lengths of fiber runs with fewer intervening secondary hubs between a SPE and an operator's CO/head end equipment may be located in the field, yet relatively close to a subscriber, thereby reducing construction costs. Overall costs of a FTTH network are further reduced with respect to a PON because the costs of the optics at the SPE devices, as well as the switch node, are lower.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein with respect to integrated circuits, memory chips, busses, connectors, transceivers, housings, fiber cable, fiber modules and ports, software routines and circuit functions, for example, no specific circuit component or software code is required to be used in the practicing of the present invention. Indeed, it would be a matter of routine skill to select the configuration and values of, for example, connectors, resistors, capacitors, inductors, diodes, etc.; active components such as, for example, transistors and integrated circuit and memory chips, specific software code, connectors and cabling; and other components in implementing the invention in a particular installation application.

Figure 1:
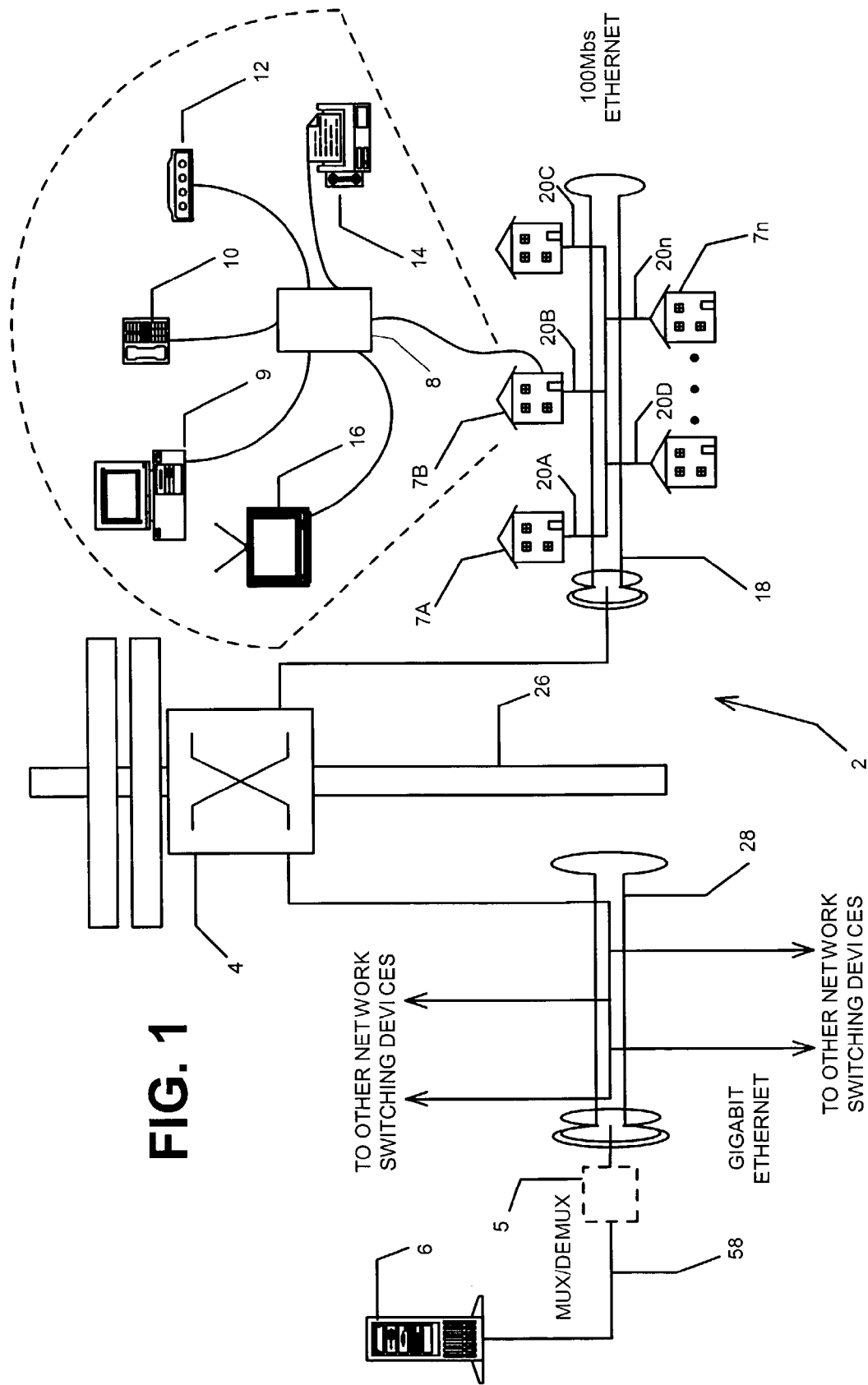
FIG. 1 illustrates a system that uses a network-switching device for routing high bandwidth signals between a head-end and a plurality of different types of fiber-connected subscriber-premise equipment devices.

Turning now to the figures, FIG. 1 illustrates a typical network system 2 that uses an outdoor-pole-mounted network-switching device 4 for routing high bandwidth signals between a head-end 6 and a plurality of subscriber locations 7. A passive Dense Wavelength Division Multiplexing ("DWDM") multiplexer/demultiplexer 5 may also be used in between the switch 4 and the CO/head-end 6 depending upon a particular service provider's network topology 2. At the subscriber premises 7, a network interface unit 8 for providing an interface between the network system 2 and a variety of user devices will typically be located at the outside wall, or possibly inside the building at each subscriber location 7, which may be residential dwellings or places of business. The subscriber's user devices may include a personal computer 9, a telephone 10, a modem 12, a fax machine 14 and a television 16. Other devices may include a DSTB, an IP telephone or an IP MTA. It will be appreciated that the preceding list of equipment devices is given for purposes of example, and that other devices, both analog and digital, may be included in the list.

Each of the plurality of network interface units 8 associated with corresponding subscribers are connected to subscriber pipeline 18, which may be, for example, a 100 Mbps Ethernet fiber cable, via subscriber drop lines 20. It will be appreciated that subscriber pipeline 18 will typically comprise a plurality of fibers, with each fiber or pair of fibers being assigned and connected to a different subscriber's 7 network interface unit 8. Thus, subscriber drop line 20 will be one (or pair) of these plurality of fibers that will typically exit the pipeline cable 18 at a point appropriately near the subscriber's 7 location as convenient, i.e. in front of a subscriber's house near the street. Thus, overall construction costs can be minimized. At the other end of the subscriber pipeline cable 18, each subscriber-assigned fiber or pair attaches to a downlink (subscriber side of switch) subscriber port at the network-switching device 4, wherein each port is associated with a particular subscriber 7. Network-switching device 4 may typically be mounted on an aboveground pole 26, but may also be pedestal or stand mounted, or located underground. It is desirable that the network-switching device 4 be located near the subscribers 7 to restrict fiber run lengths, therefore minimizing laser costs.

The network-switching device 4 interfaces subscriber 7 with the head-end via uplink (network service provider side of switch) transmission pipeline 28. In the simplest network topology where a single switch 4 is connected via a single fiber, or pair, to the head end 6, transmission pipeline 28 may be, for example, a gigabit Ethernet fiber cable known in the art, having a plurality of fibers, wherein each fiber, or pair, is assigned to a separate switch. Each fiber, or fiber pair, of pipeline 28, which in this simple scenario also serves as the longhaul backbone, is connected to its assigned network-switching device 4 at an uplink port. The other end of each fiber, or pair, of the uplink pipeline cable 28 is connected to a port at the CO/head-end 6.

In more complex network topology architectures, a plurality of switches 4, each serving multiple subscribers, may communicate with a hub device, such as, for example, DWDM mux/demux 5. In such architecture, pipeline 28 may be referred to as a local fiber network. The fiber connecting mux-hub 5 and the head end 6 may be referred to in the art as a longhaul backbone 58.

As discussed above, using network switching device 4 in system 2 provides an interface between uplink pipeline 28 and downlink pipeline 18. Thus, regardless of the configuration and type (i.e. coaxial versus twisted pair versus fiber) of pipeline used for the downlink pipeline 18 and the uplink pipeline 28, or the types of network interface units 8 used by each subscriber 7, transmitting and receiving signals is facilitated between the head-end 6 and any of the plurality of subscriber drop lines 20A-20n.

Figure 2:
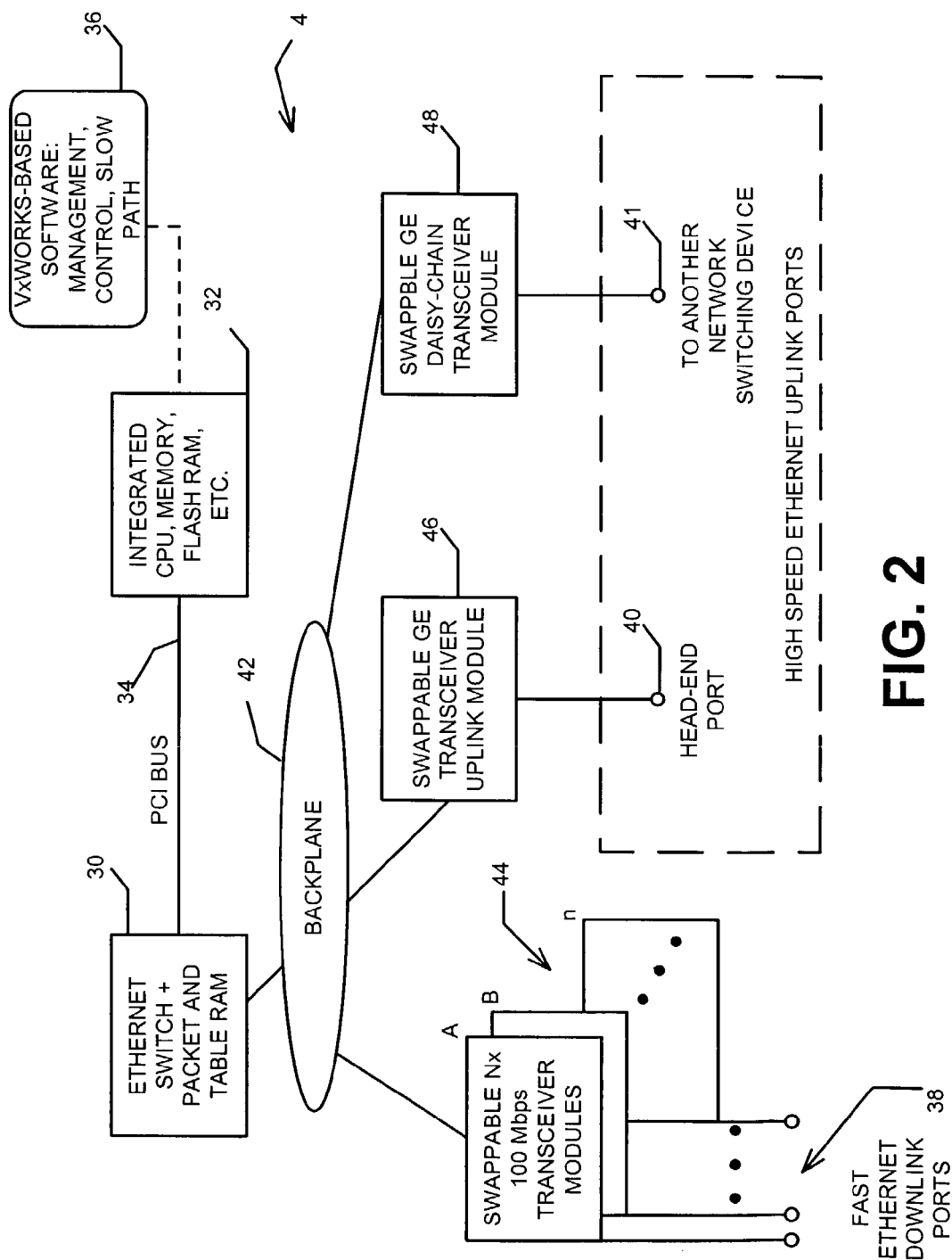
FIG. 2 illustrates a block diagram of the component aspects of a network-switching device for routing high bandwidth signals between a head-end and a plurality of different types of fiber-connected subscriber-premise equipment devices.

Turning now to FIG. 2, a block diagram illustrating the primary components of the network-switching device 4 that provides the aforementioned interface and switching functionality between the subscriber pipeline 18 and the head-end pipeline 28 is shown. Switch circuit 30 performs control and switching functions within the switching device 4. Switch 30 may include, for example, an integrated circuit, such as a 24×4 layer-3 Ethernet switch integrated circuit, such as the IXE2424 manufactured by Intel Corporation. The switch 'chip' 30 is controlled by integrated CPU 32, which is connected to the switch chip by a PCI bus known in the art. CPU 32 controls Ethernet switch 30 and the routing of signals thereby, in accordance with software 36 stored in and executed by the CPU.

Among other functions, switch 30 facilitates the interfacing of signals between a plurality of subscribers and one or more CO/head-end devices. These signals are typically bi-directional, in other words coming to and going away from the network switch device 4. The downlink (subscriber side of the switch) signals enter or exit switch 4 at downlink ports 38, which are preferably Fast Ethernet ports. Uplink (network operator side of the switch) traffic signals enter or exit at ports 40 and 41, which are preferably high-speed Ethernet ports. Each Port 38 typically connects to a drop fiber/pair, or copper (typically) twisted pair, for communicating with a subscriber's premise equipment. Ports 40 and 41 typically connect to an optical fiber/pair, or twisted pair, for communicating with a CO/head-end 6, an intermediate DWDM mux/demux 5 between the respective port and CO/head end, or possibly another network switching device 4.

When a signal is present at the Fast Ethernet ports 38 or the High Speed Ethernet ports 40 and 41, the signal is communicated to or from switch module 30 via transceiver modules and a backplane 42. The backplane 42 is mechanically configured to receive modules 44, first high-speed module 46 and second high-speed module 48, as well as switch module 30. A third high-speed uplink module may also be connected to the backplane 42. For the Fast Ethernet signals, modules 44A-n transmit and receive signals to and from ports 38 respectively. For the High Speed Ethernet signals, modules 46 and 48 transmit and receive signals to and from ports 40 and 41 respectively. The switch 4 of the preferred embodiment also supports a third uplink module. Any of the three uplink modules may be configured as a duplex module; that is, a module supporting two uplinks and two uplink ports. Accordingly, because the IXE2424 integrated circuit 30 supports four uplinks, switch 4 may be configured to support four uplinks as well. Selection of a different integrated circuit 'chip' 30 that supports more than four uplinks would accordingly allow switch 4 to support a similarly greater number of uplinks.

Still referring to FIG. 2, a particular physical arrangement of the modules with respect to one another, as installed in switch 4, may not be required, as the backplane 42 may be manufactured to accommodate a variety of module arrangements. This module-configuration-flexibility facilitates various fiber approach angles to accommodate a variety of different physical scenarios. Thus, for example, the Fast Ethernet ports 38 may be arranged at one end of switch device 4 and the High Speed ports 40 and 41 at the other, or the former may be split such that half are at one and half at the other, while the latter are near the center of the switch device.

The modules themselves provide flexibility and scalability because they are easily inserted and removed from switch device 4. For example, drop cables to subscribers may initially be twisted pair cable when a network is initially established by a service provider. After time, competitive pressure may cause a provider to choose to upgrade drop cables serving subscriber's premise equipment to fiber, thereby providing greater speed and reliability. The initial downlink modules 44 may be designed for twisted pair cabling, for example, but can be swapped out for modules designed to interface with Fast Ethernet signals. Moreover, the modules 44 can be swapped while the switch device 4 is electrically energized and processing traffic signals. Thus, if only one module is being swapped for an upgrade module (e.g., module with copper port swapped for a module with a fiber port) or a repair module (e.g., same type of module replacing a defective one), service to subscribers that are served by the remaining modules 38 that are not being swapped is unaffected by the maintenance activity. This feature is what is referred to by the term 'hot-swappable.'

In addition to ease of maintenance, (easy to swap out a defective module for a new one), the hot-swappable modularity also facilitates scalability. Each optical switch will preferably be configured with six downlink modules A-F, however, fewer or greater than six may be desirable in some installations, depending on initial subscriber load. The number of subscribers served by a particular optical switch 4 may be scaled, or increased by using downlink transceiver modules 44 that include more than two downlink ports 38 per module; for example, each downlink module preferably has four downlink ports.

Figure 3:
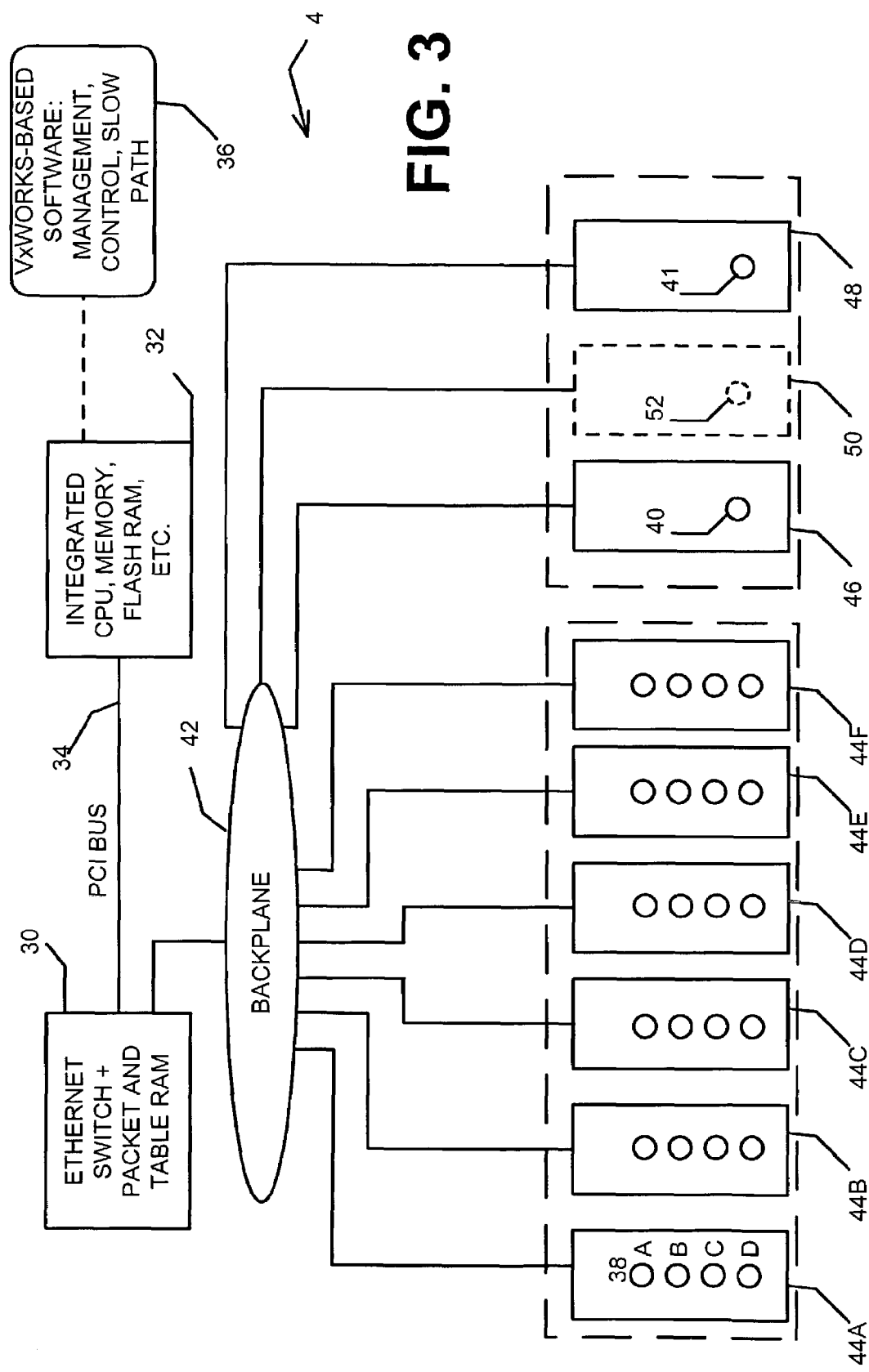
FIG. 3 illustrates a block diagram of a network switching device using quad downlink transceiver modules, each having four downlink ports, a daisy chain uplink transceiver module, a primary uplink transceiver module and an optional third uplink transceiver module.

A typical configuration using such a quad downlink module is shown in FIG. 3. Although the switch device 4 may be expanded to accommodate more than six downlink modules, a preferred embodiment includes six downlink modules. Using six quad downlink modules 44A-F, each having four downlink ports 38, the switch 4 could serve twenty-four subscribers simultaneously. For example, port 38A of quad module 44A could connect to a drop line for a particular subscriber, port 38B to another subscriber, and so forth. It will be appreciated that each quad module 44A-F may connect up to four subscribers in a similar manner as just described with respect to module 44A.

To scale beyond twenty-four subscribers served by a single uplink fiber driven by a DWDM uplink module, multiple switch devices 4 may be connected together in a 'daisy-chain' fashion such that one switch device 4 acts as a 'master' to aggregate signals from one or more other 'slave' switches in order to transmit and receive subscriber traffic from the master as well as the slave(s) over a single uplink fiber/pair. In such a scenario, the master switch 4 would have at least one DWDM uplink module and corresponding port for communicating with a CO/head end or a DWDM mux/demux device. Another uplink module and port of the master would connect to an uplink port of one of the slaves. Another uplink port of this first slave would connect to an uplink port of another slave, and so forth. There is no limit to how many switches can be connected in such a fashion, but in the preferred embodiment, typically four are connected in such a manner. Thus, a typical High Speed Ethernet fiber/pair of four daisy-chain-connected switches 4 can simultaneously support the transmission or reception of approximately 96 subscriber traffic signals.

Furthermore, when this DWDM uplink module is in communication with a mux/demux device 5, the mux/demux device can typically aggregate uplink traffic from ten other master switches, thus allowing traffic from 960 subscribers to travel on a single fiber of the longhaul backbone.

For example, a single mode fiber capable of transmitting twenty multiplexed signals each having a slightly different carrier wavelength could serve 960 subscribers as opposed to a typical PON that can only serve thirty-two subscribers. Thus, twenty-nine fewer fibers would be required to handle the same number of subscribers. Furthermore, using more than twenty wavelengths comprising ten pairs (ten wavelengths used for upstream traffic and the other ten used for downstream) would allow an even greater number of subscribers to be served by a single long haul fiber. However, depending on the quality and design of the equipment at either end of the fiber, service quality may become a factor as the number of wavelengths used increases.

Thus, a large number of subscribers can be served by a relatively small number of switch devices 4, without the need for multiple CO/head-end facilities in relatively close proximity, thereby reducing network costs and increasing network reliability and performance. In addition to supporting more subscribers over a single fiber by using DWDM, multiple uplink capability allows for more complex architecture between the outside plant switch and the operator's equipment.

For example, one fiber can be dedicated for use by equipment that has been optimized for carrying video while another is used to carry data other than video. The optional third uplink transceiver module 50, as shown in FIG. 3, can be used to transmit and receive the dedicated video signal at port 52. Thus, traffic signal bandwidth reserved for non-dedicated-video is not reduced.

In addition to the 960:32 scaling advantage provided in the preferred embodiment over a typical PON system, by using active components in switch 4, long-haul ability is provided for the uplink fibers between the switch and a CO/head-end. Moreover, by placing the active components near (typically within 6,500 feet, for example) a subscriber, the costs of the optical components and elements of the subscriber's premise equipment is substantially reduced, thereby giving a substantially lower overall system cost as compared with a PON system.

Figure 4:
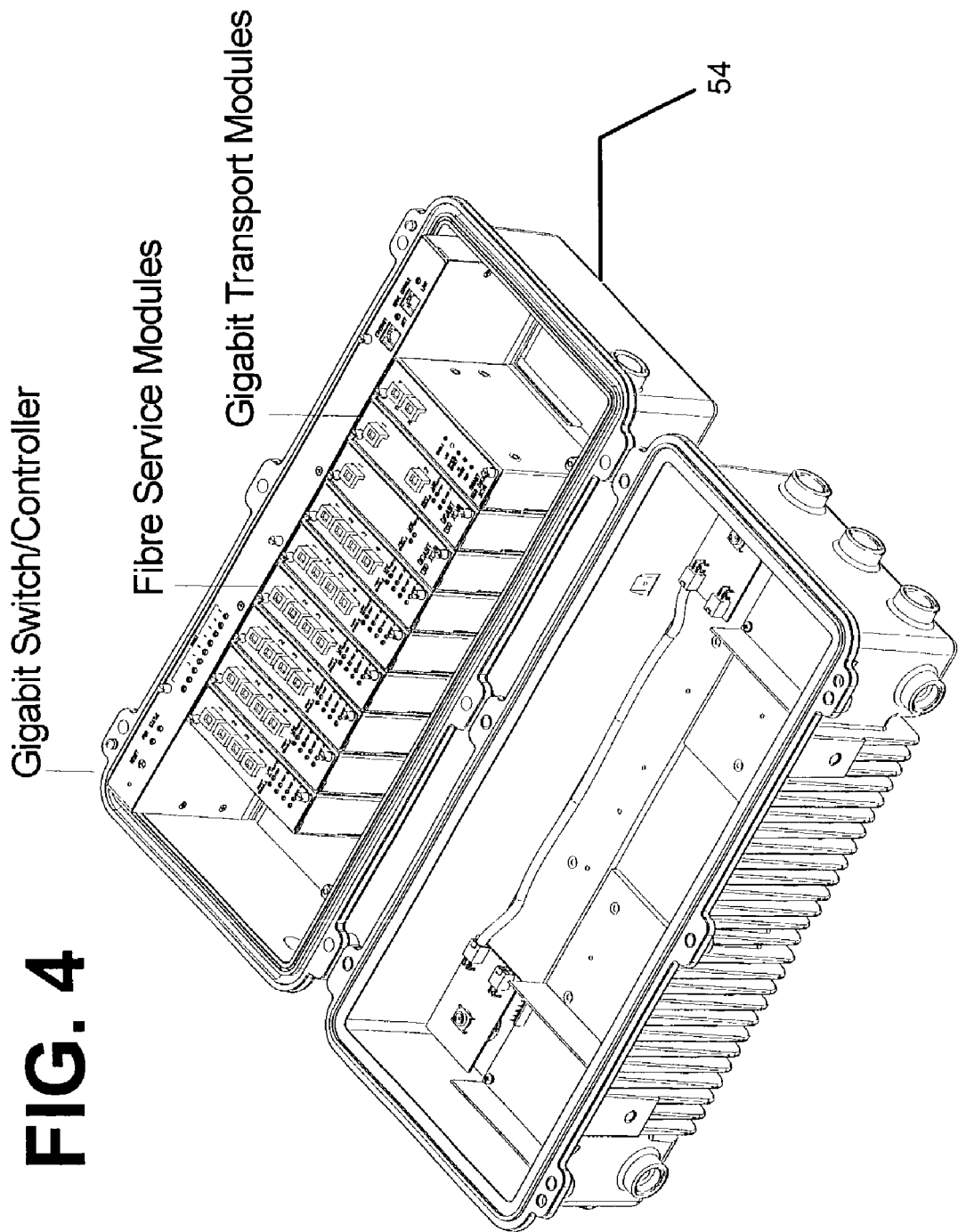
FIG. 4 illustrates an optical switch having components inside an environmentally hardened enclosure.

Accordingly, it will typically be desirable to enclose the switch device 4 in an environmentally hardened housing 54 as shown in FIG. 4, to allow outdoor placement as close to a plurality of subscribers as possible. The housing 54 should be typically suitable for mounting on a pole, strand, or within a street cabinet or vault. This reduces, or eliminates, the need for secondary hubs and CO locations sprinkled throughout the network service area, as the active components of switch 4 can feed a signal through an uplink fiber 60 or more kilometers ("km"). In some cases, this distance can be as great as 200 km. This contrasts with a typical PON system where the maximum distance from a subscriber to a hub or CO is typically less than 20 km.

Figure 5:
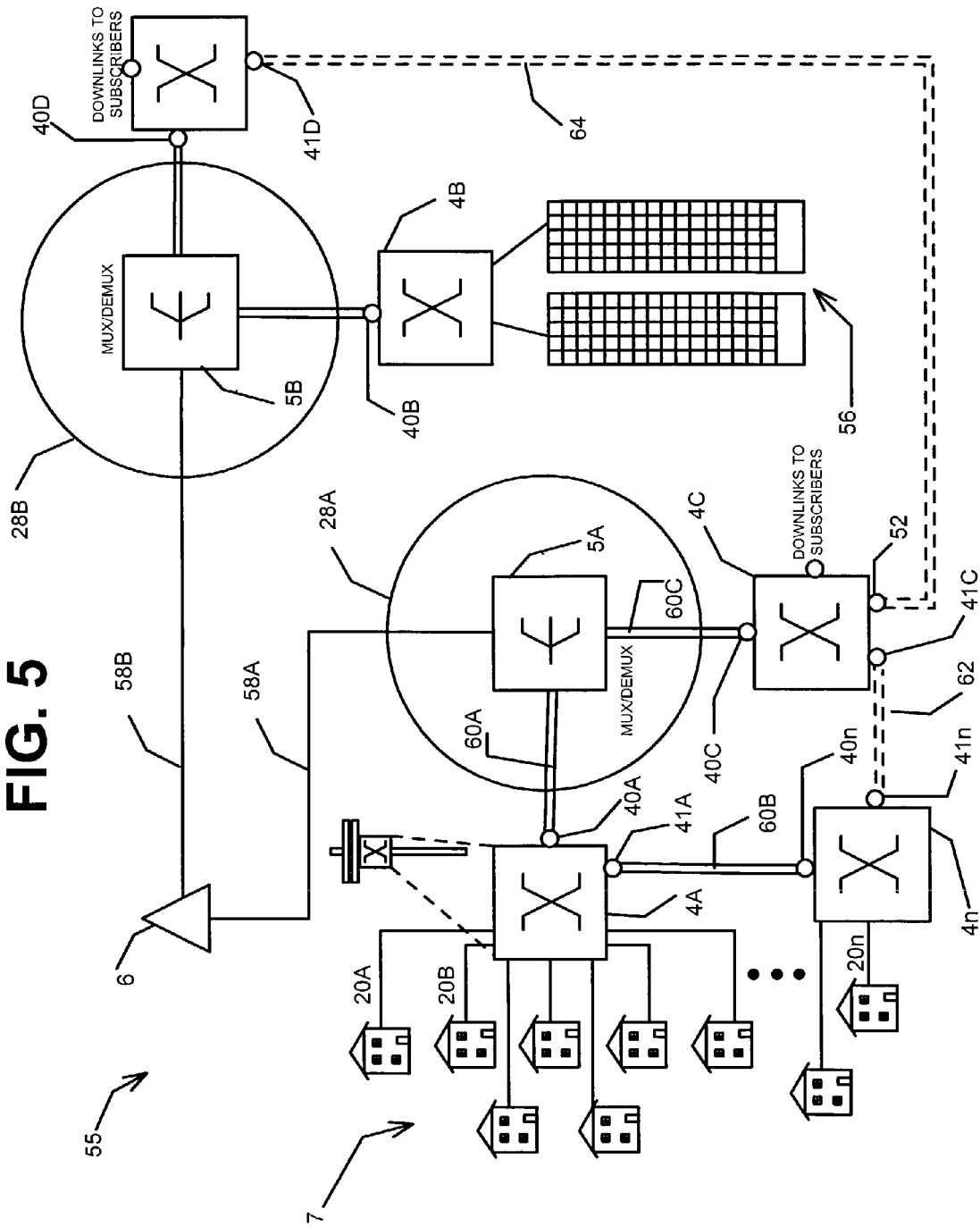
FIG. 5 illustrates a network topology demonstrating how the active optical switch facilitates flexibility and scalability in network architectural design.

Turning now to FIG. 5, a network topology 55 is illustrated showing a plurality of optical switches 4 used in conjunction with mux/demux devices 5. The switches provide service to residential subscribers 7 and commercial subscribers 56. From the mux/demux devices 5A and 5B, the longhaul fiber backbone 58 transports signals between the mux/demuxes and the CO/head end 6. An advantage of the DWDM mux/demux devices is that a single fiber, or at least only a few fibers relative to a PON system are required for the long-haul portion 58 of the network. This long-haul portion can be a large distance and is often 60 km or more. Thus, a cost savings is realized in the long-haul infrastructure 58 because fewer fiber-kilometers are required.

An illustration of but one topology 55 out of many possible variations is shown. Switch device 4A serves multiple single-family residential dwellings. As discussed above with respect to FIG. 3, typically six fast-Ethernet subscriber modules 44 will be included in switch 4, which is typically mounted on an outdoor pole as shown in FIG. 1 in housing 54 as shown in FIG. 4, with each module having four subscriber downlink ports 38 (not shown in FIG. 5 for clarity). Thus, each switch 4 will preferably serve twenty-four subscribers 20A-20X; however, it will be appreciated that more or less that six modules 44 may be included in the switch enclosure 54, and that each module may have more or less that 4 fast-Ethernet ports 38.

High-speed Ethernet port 40A is used to connect aggregating fiber 60A to DWDM mux/demux device 5A. Another high-speed Ethernet port 41A is used to facilitate connecting switch device 4A to another switch device 4n in a daisy-chain manner. Port 40A connects to local fiber network 28A, which is used to connect to port 40n of switch 4n which represents a plurality of switches, each of which may be configured to serve another twenty-four subscribers. The number of switches, and therefore the number of subscribers, that can be connected to a local fiber network 28A is determined by the type of fiber used for the local fiber network and the type of fiber used for the long haul fiber backbone 58A. This is because the bandwidth sum of all the subscribers served through backbone 58A cannot exceed the bandwidth capacity of the backbone itself. In addition, while the fiber used in an aggregating fiber/pair 60 may limit the number of subscribers that a particular switch 4 can serve, the bandwidth capacity of, for example aggregating fiber/pair 60A is typically greater that the bandwidth sum of all signals fed to switch 4A by subscriber drop lines 20.

However, when high-speed Ethernet aggregating daisy-chain transceiver module 48 (shown in FIG. 3) is used to connect port 41A of switch 4A to port 40n of switch 4n, aggregating fiber/pair 60A must pass signals from subscribers served by switch 4A, but also the aggregated signal passed by aggregating fiber/pair 60B. Furthermore, switch 4n may also have other switches connected in a daisy-chain manner. Even though aggregating fiber/pair 60A typically has greater bandwidth than the bandwidth sum of drop fibers 20A-20X and/or their associated premise equipment, if enough subscribers are aggregated by switches connected in a daisy-chain manner, aggregating fiber/pair 60A may limit subscriber bandwidth below the normal limit of their corresponding drop lines 20 and/or associated premise equipment.

In addition to the number of subscribers normally served by an aggregating fiber/pair, it may be desirable to contingently connect together in a daisy-chain manner switches that are tied to the same local fiber network, but that do not share the same aggregating fiber/pair. For example, switch 4A and 4C are tied to local fiber network 28A, but uplink port 40A passes data to network 28A via aggregating fiber/pair 60A, while uplink port 40C of switch 4C passes signals via aggregating fiber/pair 60C. However, port 41C of high-speed uplink transceiver module 48 (FIG. 3) of switch 4C may connect to port 41n of switch 4n via cross-connect fiber/pair 62. Thus, while switches 4A and 4n, and any intervening switches that normally share fiber/pair 60A connect to network 28A via port 40A of switch 4A, and switch 4C connects to the network 28A via port 40C over fiber/pair 60C, the two switches are tied together via high-speed Ethernet transceiver modules.

This provides the advantage that if, for example, fiber/pair 60C were to fail, the CPU inside switch 4C could reroute uplink signals normally routed through fiber/pair 60C through switch 4n, which could then route the signals through switch 4A and fiber/pair 60A. The same would apply if fiber/pair 60A failed. The signals of switches 4A and 4n could be routed through fiber/pair 60C. Thus, a redundant mechanism is provided to reduce the likelihood that service to subscribers would be disrupted. However, if such a scenario were to occur, depending on the total number of subscriber signals passing through a given aggregating fiber, subscriber bandwidth might be reduced.

It will be appreciated that in reference to the drawing, the 4n designation does not necessarily imply that switch 4n is the last in a daisy chain series, for example, or that only two switches may be aggregated in a daisy-chain manner. The designation of switch 4n and its associated components merely represents that a plurality of switches may be connected to network 55 via daisy-chain transceivers and ports, cross-connect transceivers and ports, direct uplink transceivers and ports, and associated aggregating fibers/pairs. Thus, although multiple switches may be connected to a given local fiber network, the total number of switches and subscribers may be limited by the number of different wavelengths that an aggregating fiber/pair, a cross connect fiber/pair, or a long haul fiber can accommodate, based on the equipment driving said fiber/fiber pair.

For example, long haul fiber 58A can support twenty different wavelengths; thus, forty different switches can be supported by local fiber network 28A, regardless of the manner in which the components thereof are connected. This provides flexibility in the configuration of a given network topology, as well as scalability that can be implemented as the demands on a given network increase.

Still referring to FIG. 5, a second local fiber network 28B is illustrated. Network 28B is shown serving business subscribers 56. Although only one switch 4B is shown serving subscribers in two separate buildings, it will be appreciated that network 28B may be scaled as described above to accommodate more than the number of subscribers that are served by switch 4B. Switch 4D illustrates how a switch can connect two separate local fiber networks together. For example, switch 4D may be used to serve business subscribers 56, or to serve other subscribers whose locations are physically proximate to the business subscribers. Switch 4D is shown connect to network 28B via high-speed uplink port 40D. High-speed port 41D is shown connecting switch 4D to switch 4C via cross-connect fiber 64 at high-speed uplink port 52 of optional uplink transceiver module 50 (FIG. 3). Similar to cross-connect fiber 62 providing a 'back up' link between two different switches of local fiber network 28A, cross-connect fiber 64 provides a contingent back up between local networks 28A and 28B. Thus, another example is provided that illustrates how multiple uplink transceiver modules, as well as subscriber downlink modules that support more than two subscribers from a single module, provide flexibility and scaling functionality in designing and building a given network architecture. Furthermore, having this functionality located in an active optical switch that places the network edge near the subscribers greatly reduces or eliminates the need for intermediate hub equipment between the subscribers and a head end. Thus, designers have a wide variety of topology arrangements to choose from when designing a given network architecture, as well as the knowledge that as subscriber's needs grow, the topology can be modified to accommodate the subscribers without the expense of acquiring additional rights of way for additional intermediate equipment. Furthermore, because active instead of passive components (the optical switch of the present invention versus splitters and the like of a PON) are used, additional intermediate equipment is not needed because the active components of the optical switch can drive a signal over a much longer long haul distance than a device located at a subscribers premise (thus the subscriber premise equipment costs are also reduced.

Another advantage provided by the active components of optical switch 4 being located in the 'outside-plant' proximate the subscribers is that the 'network edge' may be defined at the switch rather than at the subscriber premises or at the operator's CO/head end 6. For some time, operators of public data networks have relied on the concept of a 'network edge' to demarcate the trusted (operator's) side of the network from the unregulated subscriber's portion of the network. Traditionally, the demarcation between an uncontrolled subscriber link and the operator-managed controlled network has typically been either at the subscriber site 7 (through, for example, an operator-supplied interface device) or at an aggregating router, for instance, at the operator's head-end 6.

A variety of services may typically be performed at the edge, including, for example, traffic metering, shaping, and policing. In other words, allocation of the bandwidth available to and from a subscriber is controlled at the edge. The bandwidth characteristics may take on a number of attributes, including, for example, maximum allowed rate, minimum guaranteed rate, jitter and latency. Because a particular subscriber's traffic will always pass through a predetermined port, traffic intended for a particular port can be compared to predetermined criteria at the switch to determine whether the traffic should pass, and if so, what operations should be performed on the traffic information packets by the switch circuit 30 in combination with the CPU 32.

Another function the outside-plant switch 4 at the network edge can perform is traffic aggregation. Traffic from subscriber links may be aggregated and combined into one or more links back into the operator's network 28. For example, available bandwidth available on the aggregate link 60A is less than that on the sum of the subscriber links 20A-20n, so the edge device 4A may implement a congestion control strategy to provide shared use of the link. Thus, a subscriber who pays more for a higher quality of service, for example, can get bandwidth priority over a lower paying subscriber when network bandwidth availability is reduced.

In addition, traffic originating at a subscriber must be verified against the addresses allotted to that particular subscriber. Similarly, only packets addressed to that subscriber should be forwarded to that subscriber. Policy decisions may be needed for forwarding of multicast and broadcast traffic, depending on the programming services a subscriber has paid for. Switch device 4 at the edge may prevent the subscriber from originating or accessing certain services, either by blocking certain protocols or particular addresses. This may be done to protect the network from network abuse such as address spoofing by the subscriber, or to protect the subscriber from unwanted traffic, such as obscene material, or other unwanted material, such e-mail spam. Packets may be directed to different uplinks of the switch, depending on, for example, the particular subscriber service or on network redundancy and failover state. This is known in the art as packet steering.

The network edge at the switch device 4 may identify the subscriber to various other entities in the operator's network, for example, to provisioning, accounting and management servers. The network edge may provide statistical and other information about how well the operator is meeting the Service Level Agreement with the subscriber.

Other edge functions performed by the switch include providing a firewall. The network edge may protect the subscriber's network by providing address translation, encryption, and/or security logging. Another function is to facilitate the administration of providing multiple traffic services to each subscriber. Such traffic services include: telephony-over-IP, multicast-video-over-IP, video-on-demand, business-class Internet access, residential Internet access, business-class metropolitan-area-networking, video-conferencing, multi-user gaming, and portal hosting. Any single subscriber may contract for one or more of these services. The network edge must differentiate its handling of the traffic for each of these services for that subscriber.

Two methods for providing individuated subscriber services by the network edge device include (1) acting as a differentiated services ("diffserv") edge and (2) assigning services based on subscriber addresses, network addresses, or both. The term "diffserv edge" is known in the art. See, for example, Internet Society Requests for Comments (RFC) 2638 and 3086. In this scheme, the subscriber tags traffic with its desired privilege level (indicating priority and probability-of-discard-under-congestion) using the Differentiated Services Codepoint ("DSCP") in the IP packet header. The diffserv edge then compares the offered traffic with the Service Level Agreement ("SLA") negotiated by the subscriber. If the requested traffic is permitted by the SLA, the diffserv edge attempts to satisfy the requested privilege level. Otherwise, it may discard the traffic or ignore any claimed privilege.

For example, a Voice-over-IP conversation may request high-priority of service. The subscriber's SLA may allow such high-priority service up to some maximum limit of bits-per-second. The diffserv edge implements the queueing necessary to effect the priority, while policing the subscribed limit. Traditionally, the diffserv edge may use whatever means are available to decide which traffic belongs to which subscriber, by using, for example, a physical port number. Although, a VLAN tag or virtual circuit identifier are not required because the edge is at the switch, these data could also be used if, for example, traffic is received from another network that uses VLAN tags and virtual circuit identifiers.

Another method of providing individuated subscriber services includes assigning services based on subscriber addresses, network addresses, or the pairing of both. In this scenario, the services offered to a particular subscriber are identified by the IP address of either the subscriber device (for example, an Ethernet phone) or by the network server (for example, a video-on-demand-over-IP server or a voice call gateway), or by both. For example, a Voice-over-IP conversation is recognized at the network because it originates at an Ethernet phone. The network edge implements the queuing necessary to prioritize the call, while policing against a subscribed limit. As with the diffserv edge scenario, address differentiation differentiates traffic that belongs to a single subscriber; subscribers may vary in their Service Level Agreements. The network edge may use whatever means are available to decide which traffic belongs to which subscriber. As discussed above, it may use physical port number, VLAN tag, or virtual circuit identifier. Placing the network edge in the outside plant, which is the first point of physical aggregation in the network, provides advantages over the centralized approach, which places the edge at the CO/head end, and also over the subscriber-premise-located edge. For example, with respect to the centralized approach, subscribers can efficiently share an aggregation link back to the operator's head-end, while at the same time, service and security requirements for each subscriber can still be met. Given the state of the art in network switching technology, it is more cost-efficient to process a few subscribers at relatively high data rates in distributed switches than to attempt to process many subscribers in a single large aggregator, such as at a CO/head end. In addition, inefficient use of network resources, i.e. bandwidth, due to idle virtual circuits of a VLAN, can be avoided. With respect to the subscriber-premise scenario, placing the edge at the optical network switch 4 eliminates the need for an expensive device at each subscriber location.

Figure 6:
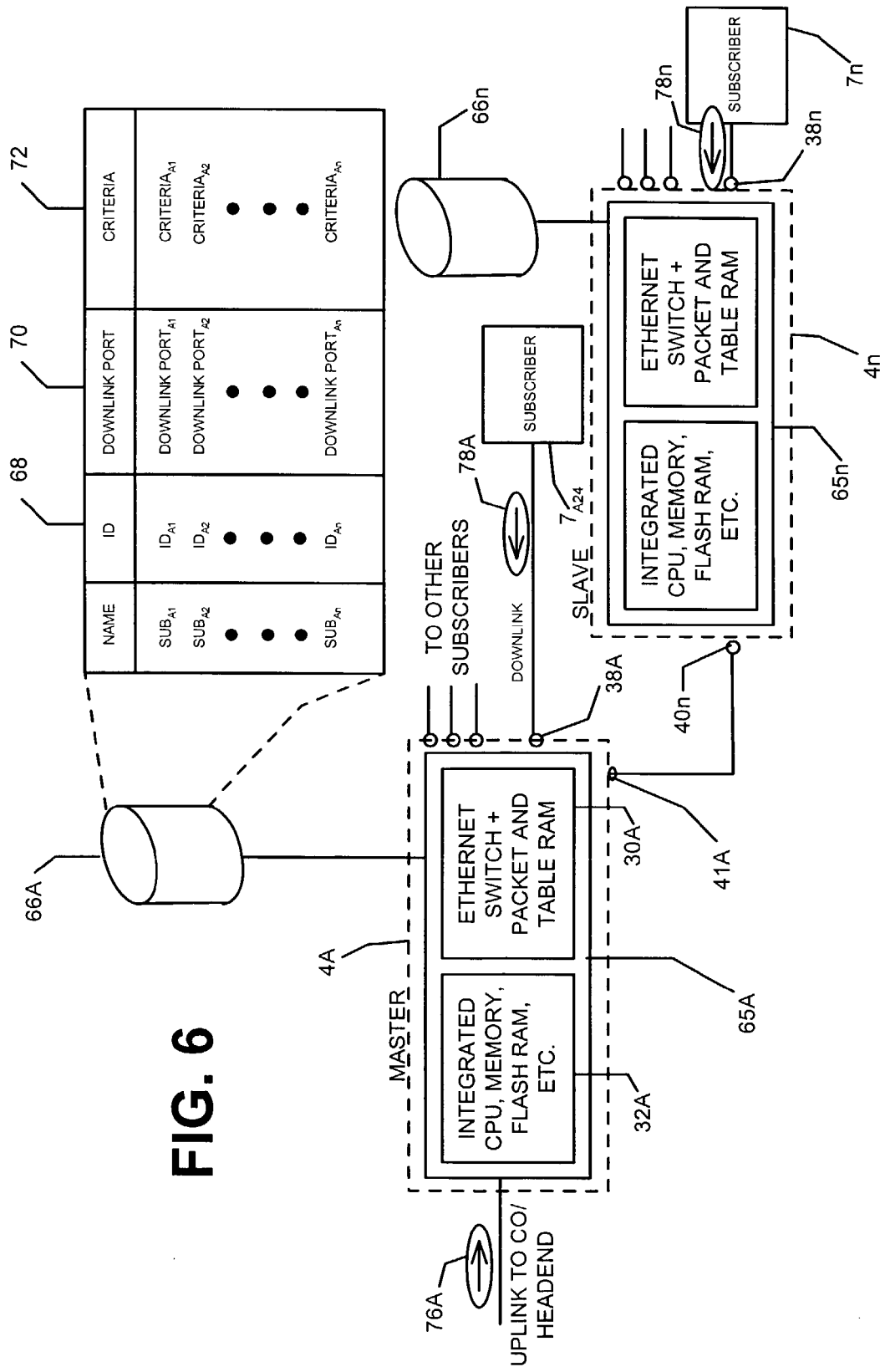
FIG. 6 illustrates the implementation of network edge functionality by applying predetermined criteria at a switch to a packet of traffic information.

Turning now to FIG. 6, because the switch device 4 uses active components, e.g. the CPU 32 and silicon layer-3 switch, collectively referred to as intelligent switch 65, as opposed to passive components as in a typical PON system, the intelligent switch can perform the abovementioned edge functions and provide the abovementioned benefits of speed and reliability. This is because the edge functionality takes place at the switch rather than at an SPE or a central aggregation CO/head end where the traffic to be operated upon has been transferred via VLAN, or other similar scheme known in the art. Since the intelligent switch 65 has memory and processing capability, a database 66 can be loaded. Database 66 may contain information corresponding to each subscriber served by a particular switch, or switches when multiple switches are connected in a daisy-chain manner.

In the embodiment shown in FIG. 6, database 66A contains information about each of its twenty-four, typically, subscribers. This information may include a subscriber ID field 68, the downlink port field 70 corresponding to each subscriber for associating the subscriber with traffic at a particular downlink port 38 and a criterion/criteria field (or fields) 72 that determines how the traffic is to be treated or operated upon. The operations performed on the traffic, as determined by evaluation of the packet traffic against the appropriate criterion or criteria include the traditional edge functions as described above, which may include instructions and information for performing traditional network edge functions as discussed above, such as for example, metering, shaping, policing, traffic aggregation, address control, filtering, subscriber identification, service level agreement monitoring, and packet steering. Other functions and algorithms in addition to these may also be deemed appropriate and desirable by a network operator.

In a daisy-chain scenario where switch 4A is the master and 4n is a slave, the edge functions may be performed on a packet 78n received from subscriber 7n at port 38n by intelligent switch 65n in a manner similar to that described above in connection with intelligent switch 65A and database 66A. After intelligent switch 65n evaluates packet 78n against the appropriate criterion or criteria 72n, intelligent switch 65n may perform the required packet operation and then either pass the processed packet to intelligent switch 65A via port 41A or discard the packet. As the link between port 40n of switch 4n and port 41A of switch 4A is trusted, the now-processed packet traffic 78n is passed to switch 4A where the packet information is aggregated with packets from other subscribers and switches as described above in reference to FIGS. 1-5.

Although the performance of the various edge functions has been described as being performed by an intelligent switch, the operations could be performed by software, hardware, firmware or a combination thereof. In addition, a switch's transceivers may also be configured to operate on packets in conjunction with, or independently from, the intelligent switch portion of switch 4.

The database information may be loaded to intelligent switch through a field maintenance port or from the operator's server at a CO/head end. For example, a subscriber ID may be received from a SPE when a subscriber choose a change in service level using a personal computer. Or, if a subscriber requests a premium television service, the respective database criteria modification can be initiated from the CO/head end so that the switch to which the subscriber is connected will allow the desired multicast or unicast programming signal to be passed to the appropriate subscriber.

What is claimed is:

1. An optical switch for use in a broadband network comprising:

a packet processing switch module for switching signals present at a plurality of fast Ethernet ports and a plurality of high speed Ethernet ports;

a plurality of transceiver modules for interfacing signals between the ports and the switch module;

a passive backplane adapted to mechanically receive said switch module and said plurality of transceiver modules, the backplane configured to pass signals between said switch module and said plurality of transceiver modules;

wherein one of the plurality of transceiver modules includes a first high-speed Ethernet uplink transceiver module having first and second high-speed Ethernet uplink ports for interfacing corresponding first and second signals between said first and second ports and said packet processing switch module; and wherein a second high speed Ethernet uplink transceiver module includes a daisy-chain transceiver module for interconnecting the optical switch to a daisy-chain transceiver of another optical switch.

2. An optical switch for use in a broadband network comprising:

a packet processing switch module for switching signals present at a plurality of fast Ethernet ports and a plurality of high speed Ethernet ports;

a plurality of transceiver modules for interfacing signals between the ports and the switch module;

a passive backplane adapted to mechanically receive said switch module and said plurality of transceiver modules, the backplane configured to pass signals between said switch module and said plurality of transceiver modules;

wherein at least one of the transceiver modules includes a high-speed Ethernet uplink transceiver, said high-speed Ethernet uplink transceiver further including a physical layer device; and wherein at least one of the downlink transceiver modules comprises four fast Ethernet downlink ports.

3. An optical switch for use in a broadband network comprising:

a packet processing switch module for switching signals present at a plurality of fast Ethernet ports and a plurality of high speed Ethernet ports;

a plurality of transceiver modules for interfacing signals between the ports and the switch module; and a passive backplane adapted to mechanically receive said switch module and said plurality of transceiver modules, the backplane configured to pass signals between said switch module and said plurality of transceiver modules; and wherein at least one of the transceiver modules includes a fast Ethernet downlink transceiver module having four downlink ports.

4. An optical switch for use in a broadband network comprising:

a packet processing switch module for switching signals present at a plurality of fast Ethernet ports and a plurality of high speed Ethernet ports;

a plurality of transceiver modules for interfacing signals between the ports and the switch module;

a passive backplane adapted to mechanically receive said switch module and said plurality of transceiver modules, the backplane configured to pass signals between said switch module and said plurality of transceiver modules;

wherein at least one of the transceiver modules includes a high-speed Ethernet uplink transceiver, said high-speed Ethernet uplink transceiver further including a physical layer device;

wherein at least one of the downlink transceiver modules comprises four fast Ethernet downlink ports;

wherein at least one of the downlink ports connects the switch to a subscriber premise equipment device.

5. An optical switch for use in a broadband network comprising:

a packet processing switch module for switching signals present at a plurality of fast Ethernet ports and a plurality of high speed Ethernet ports;

a plurality of transceiver modules for interfacing signals between the ports and the switch module;

a passive backplane adapted to mechanically receive said switch module and said plurality of transceiver modules, the backplane configured to pass signals between said switch module and said plurality of transceiver modules;

wherein the high speed Ethernet ports are uplink ports for passing signals between the switch and the network; and wherein one of the uplink ports provides DWDM capability for interconnecting with a DWDM multiplexer/demultiplexer for interfacing the switch to the network.

6. An optical switch for use in a broadband network comprising:

a packet processing switch module for switching signals present at a plurality of fast Ethernet ports and a plurality of high speed Ethernet ports;

a plurality of transceiver modules for interfacing signals between the ports and the switch module;

a passive backplane adapted to mechanically receive said switch module and said plurality of transceiver modules, the backplane configured to pass signals between said switch module and said plurality of transceiver modules;

wherein the high speed Ethernet ports are uplink ports for passing signals between the switch and the network;

wherein one of the uplink ports provides DWDM capability for interconnecting with a DWDM multiplexer/demultiplexer for interfacing the switch to the network; and wherein the DWDM uplink ports communicatively connects to a central office/head-end device via a single fiber.

7. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports; and wherein the at least one switch includes six downlink transceivers, each downlink transceiver defining four downlink ports.

8. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports; and further comprising a first switch and a second switch, wherein the first switch includes a first uplink port and a second uplink port, the second uplink port being communicatively connected via an aggregating fiber pair to an uplink port of the first switch for operating the first switch as a master and the second switch as a slave in a daisy-chain manner.

9. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports; and further comprising a plurality of active distribution switches and at least one DWDM mux/demux aggregator, the at least one aggregator being communicatively connected to an uplink port of each switch via an aggregating fiber pair for aggregating uplink traffic of the active switches with a single uplink fiber between the aggregator and the central office/head end.

10. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports;

further comprising a plurality of active distribution switches and at least one DWDM mux/demux aggregator, the at least one aggregator being communicatively connected to an uplink port of each switch via an aggregating fiber pair for aggregating uplink traffic of the active switches with a single uplink fiber between the aggregator and the central office/head end; and wherein one aggregator and the switches connected thereto define a local fiber network.

11. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports;

further comprising a plurality of active distribution switches and at least one DWDM mux/demux aggregator, the at least one aggregator being communicatively connected to an uplink port of each switch via an aggregating fiber pair for aggregating uplink traffic of the active switches with a single uplink fiber between the aggregator and the central office/head end;

wherein one aggregator and the switches connected thereto define a local fiber network; and wherein at least one of the active switches is a master switch of a daisy chain subgroup of switches.

12. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports;

further comprising a plurality of active distribution switches and at least one DWDM mux/demux aggregator, the at least one aggregator being communicatively connected to an uplink port of each switch via an aggregating fiber pair for aggregating uplink traffic of the active switches with a single uplink fiber between the aggregator and the central office/head end;

wherein one aggregator and the switches connected thereto define a local fiber network; and further comprising a plurality of local fiber networks.

13. A network for distributing bi-directional high bandwidth traffic signals from a central office/head end to a plurality of subscribers comprising:

at least one distribution switch having active components for routing traffic signals between a high speed Ethernet uplink port and a plurality of subscriber fast Ethernet downlink ports;

wherein the at least one switch further comprises a plurality of uplink transceivers and a plurality of downlink transceivers, each uplink transceiver defining at least one uplink port and each downlink transceiver defining more than two downlink ports;

further comprising a plurality of active distribution switches and at least one DWDM mux/demux aggregator, the at least one aggregator being communicatively connected to an uplink port of each switch via an aggregating fiber pair for aggregating uplink traffic of the active switches with a single uplink fiber between the aggregator and the central office/head end;

wherein one aggregator and the switches connected thereto define a local fiber network further comprising a plurality of local fiber networks; and wherein an uplink port a switch belonging to a first local fiber network is communicatively connected to an uplink port of a switch belonging to a second local fiber network via a cross-connect fiber pair.

* * * * *